United States Patent
Doyle

[19]

[11] Patent Number: 6,100,814
[45] Date of Patent: Aug. 8, 2000

[54] REMOTE CONTROL WAKE UP DETECTOR SYSTEM

[75] Inventor: Paul C. Doyle, Northville, Mich.

[73] Assignee: Lear Automotive Dearborn, Inc., Southfield, Mich.

[21] Appl. No.: 08/646,417

[22] Filed: May 7, 1996

[51] Int. Cl.[7] .................................................. H04Q 7/00
[52] U.S. Cl. ................................ 340/825.69; 455/343
[58] Field of Search ...................... 340/825.69, 825.54, 340/825.77, 539; 361/88, 89; 455/63, 343, 68, 151.2, 230, 352, 307, 231

[56] References Cited

U.S. PATENT DOCUMENTS

| | | |
|---|---|---|
| 5,115,236 | 5/1992 | Kohler . |
| 5,153,580 | 10/1992 | Pollack ........................... 340/825.69 X |
| 5,216,674 | 6/1993 | Peter et al. .............................. 361/88 X |
| 5,305,459 | 4/1994 | Rydel .............................. 340/825.69 X |
| 5,465,392 | 11/1995 | Baptist et al. ........................ 455/343 X |
| 5,471,212 | 11/1995 | Sharp et al. . |
| 5,523,745 | 6/1996 | Fortune et al. ................. 340/825.69 X |
| 5,686,891 | 11/1997 | Sacca et al. .......................... 340/539 X |
| 5,744,874 | 4/1998 | Yoshida et al. ................. 340/825.69 X |

FOREIGN PATENT DOCUMENTS 0 451 060 A1  10/1991  European Pat. Off. .

*Primary Examiner*—Edwin C. Holloway, III
*Attorney, Agent, or Firm*—Brooks & Kashman, P.C.

[57] ABSTRACT

A wake up detector system is provided having a device with a sleep mode of operation to conserve energy and an awake mode operation, and an input digital data stream having a frequency. The system includes an analog filter for removing noise, and for passing the input digital data stream such that the passed input digital data stream includes a transient response consisting of an oscillating signal of increasing peak-to-peak amplitude. The system further includes a switch for comparing the transient response of the passed input digital data stream with a threshold voltage, and for switching the device from the sleep mode of operation to the awake mode of operation when the transient response of the passed input digital data stream reaches the threshold voltage.

19 Claims, 2 Drawing Sheets

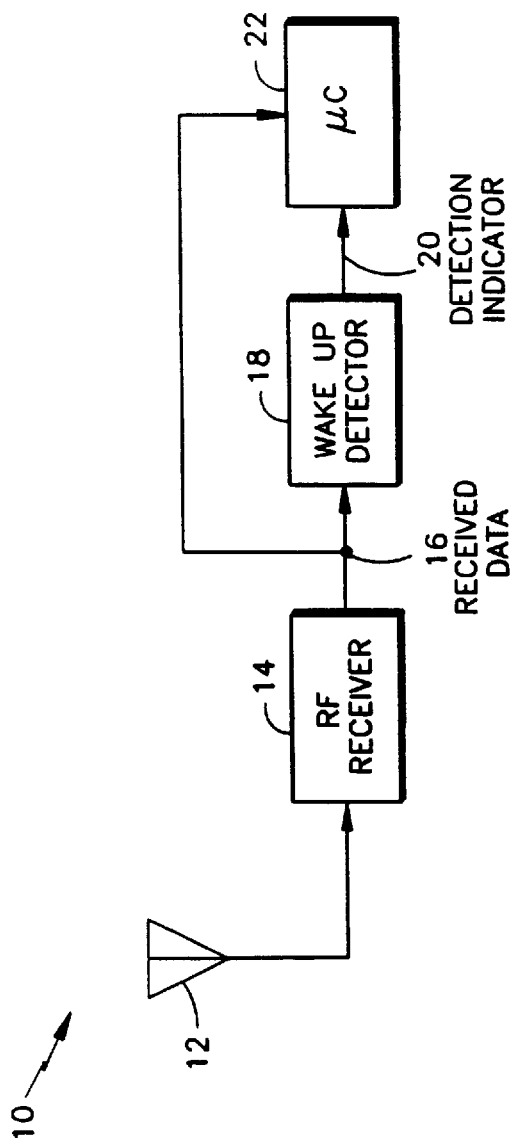
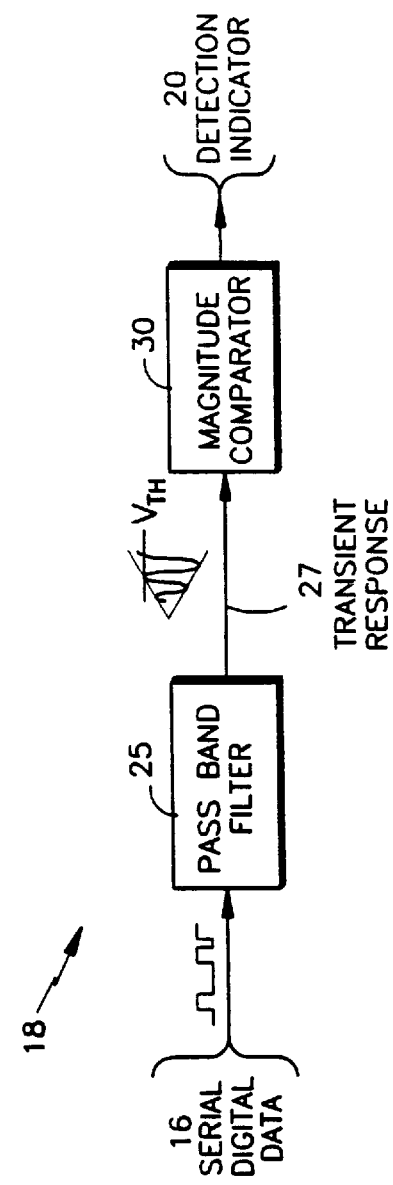
FIG.1
FIG.2

REMOTE CONTROL WAKE UP DETECTOR SYSTEM

RELATED APPLICATIONS

This application is related to a U.S. patent application (Ser. No. 08/431,386) filed on Apr. 28, 1995, commonly assigned with the present invention.

FIELD OF THE INVENTION

This invention relates generally to remote control systems, and more particularly, to a wake up detector system.

BACKGROUND OF THE INVENTION

Power consumption has become an important issue in the automotive industry. Recently, a greater emphasis has been placed on extending the life span of car batteries. Power drainage is a particular problem in colder climates where vehicles are parked for long periods of time, thereby significantly reducing the available battery power as a result of the temperature. This presents a unique dilemma when taken in combination with the increasing electrical and electronic content and complexity within present automobiles.

One solution for reducing overall power consumption has been to place specific power consuming electronic components, such as a microcontroller, into a sleep mode of operation for periods of inactivity, and an active mode of operation when external activity is detected. By such an arrangement, these components draw a minimal quiescent current from the battery during the sleep mode operation up until such time as the system requires them to be fully operational.

In order to design a remote control system having a microcontroller with a sleep and an awake mode of operation employing the above power consumption savings solution, a switch is inherently required to facilitate the transfer between operational states. In cases where a remote control system is utilizing such a scheme, the switch may be triggered by an external message. This external "wake up" message is initially received by the receiver to enable the microcontroller to change states from the sleep mode to the awake mode of operation.

Several "wake up" message schemes have been proposed for the above design scenario for controlling the switching mechanism to enable the microcontroller to switch between operational states. In one known approach, a "wake up" indicator is appended to the actual data message which is transmitted as a signal and received accordingly. Here, a series of wake up pulses are employed as the "wake up" indicator.

However, this known "wake up" indicator technique has several shortcomings. Firstly, the wake up pulses become difficult to detect by the receiver in the presence of ambient noise. Similarly, with signals also being transmitted by other devices, reception as well as detection may falsely trigger the receiver. Moreover, this known approach is relatively expensive, requiring several individual components, while providing an acceptable power savings.

As such, there remains a need for a wake up detector that has a greater immunity to ambient noise. Furthermore, a demand exists for a wake up detector which reduces the likelihood of false triggers. A need also exists for a wake up detector which is less costly to manufacture while having improved power savings.

SUMMARY OF THE INVENTION

The primary advantage of the present invention is to overcome the limitations of the prior art.

Another advantage of the present invention is to provide a wake up detector that has a greater immunity to ambient noise.

A further advantage of the present invention is to provide a wake up detector which reduces the likelihood of false triggers.

Still another advantage of the present invention is to provide a wake up detector which is less costly to manufacture.

Yet still another advantage of the present invention is to provide a wake up detector having improved power savings.

In order to achieve the advantages of the present invention, a wake up detector system is disclosed having a device with a sleep mode of operation to conserve energy and an awake mode operation, and an input digital data stream having a frequency. The system comprises an analog filter for removing noise, and for passing the input digital data stream such that the passed input digital data stream comprises a transient response. The system further comprises a switch for comparing the transient response of the passed input digital data stream with a threshold voltage, and for switching the device from the sleep mode of operation to the awake mode of operation when the transient response of the passed input digital data stream reaches the threshold voltage.

These and other advantages and objects will become apparent to those skilled in the art from the following detailed description read in conjunction with the appended claims and the drawings attached hereto.

BRIEF DESCRIPTION OF THE DRAWINGS

The present invention will be better understood from reading the following description of non-limitative embodiments, with reference to the attached drawings, wherein below:

FIG. 1 illustrates a remote control system employing the present invention;

FIG. 2 illustrates a first embodiment of the present invention; and

Figure 3:
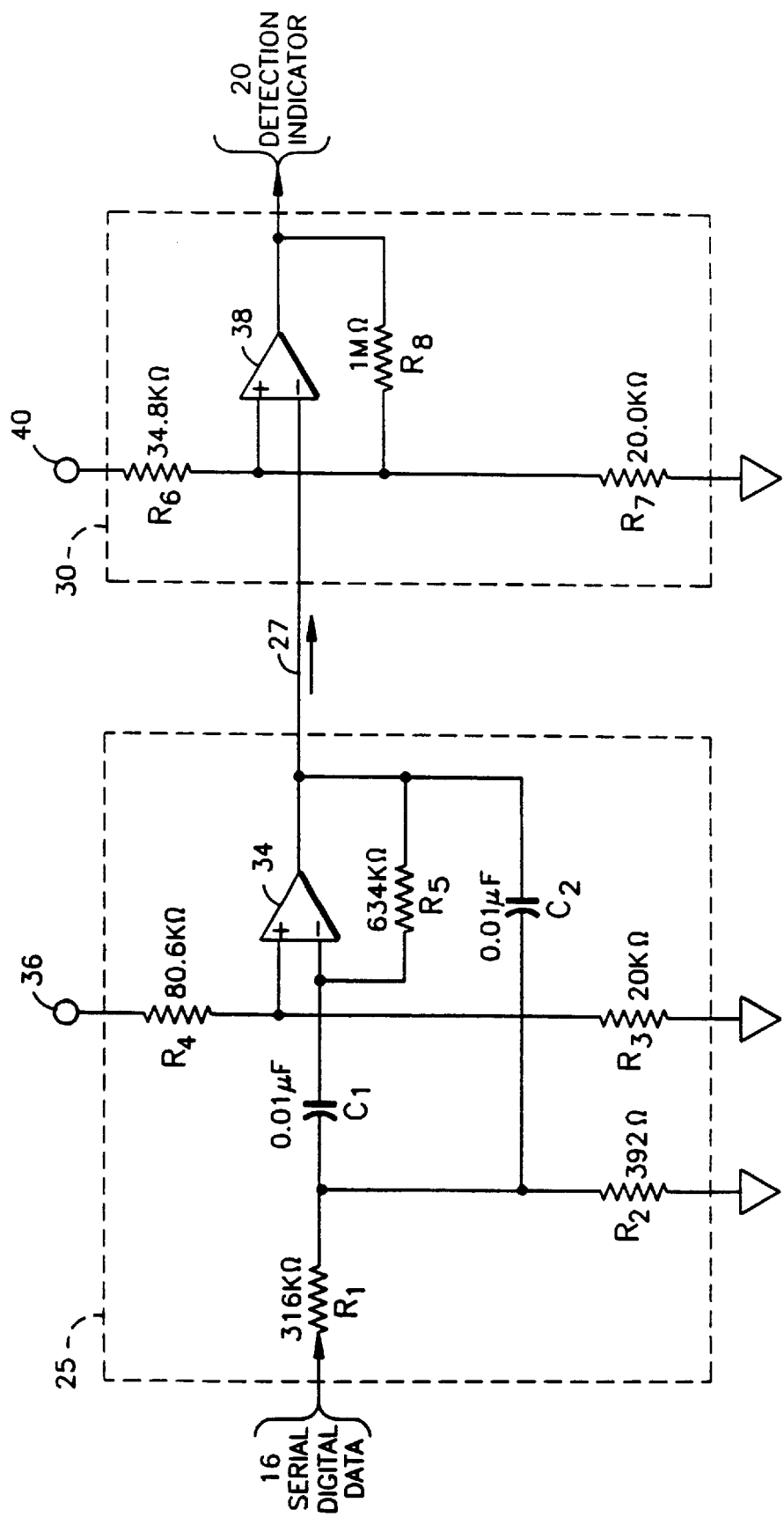
FIG. 3 illustrates the preferred embodiment of the present invention.

It should be emphasized that the drawings of the present disclosure are not to scale but are merely schematic representations and are not intended to portray the specific parameters or the structural details of the invention, which can be determined by one of skill in the art by examination of the information herein.

DETAILED DESCRIPTION OF THE PREFERRED EMBODIMENTS

Referring to FIG. 1, a remote control system 10 is illustrated employing the present invention. System 10 preferably functions as the complete receiver portion of a remote control device for receiving an analog remote control signal (not shown). The analog remote control signal preferably comprises serial Manchester encoded data, mode of operation information and an amplitude shift key ("ASK") modulation scheme. It should be apparent to one of ordinary skill in the art that other modulation techniques are compatible with the present invention including frequency shift key ("FSK") modulation.

In acting as a complete receiver, system 10 comprises an antenna 12. Antenna 12 is coupled with an RF receiver system 14. RF receiver system 14 functionally converts the received analog remote control signal into received serial digital data 16 having a frequency and mode of operation information. Serial digital data 16 acts as an input to both wake up detector 18 and those power consuming electronic components that are to operate between an active mode and a sleep mode of operation, such as microcontroller 22.

Operationally, wake up detector 18 receives serial digital data 16 from RF receiver 14 to determine whether to awake microcontroller 22 from a sleep mode. As detailed hereinbelow, wake up detector examines a transient response of serial digital data 16 against a threshold voltage. In the event certain conditions are met, wake up detector generates a detection indicator 20 causing the state of microcontroller 22 to switch from a sleep mode to an active mode of operation. As a result, microcontroller 22 is enabled to process data 16 directly from RF receiver 14.

Referring to FIG. 2, a first embodiment of the wake up detector 18 of FIG. 1 is shown. To functionally provide detection indicator signal 20 as a result of examining serial digital data 16, wake up detector 18 comprises a filter 25 and a magnitude comparator 30.

Filter 25 removes ambient noise while simultaneously passing energy operating at a frequency range encompassing the frequency of serial digital data 16. As a result, serial digital data 16 is passed through filter 25. Filter 25 preferably comprises an active bandpass filter, though it should be apparent to one of ordinary skill in the art that alternate realizations, including a low pass filter coupled in series with a high pass filter, may also be employed. With respect to the preferred embodiment, bandpass filter 25 has a center frequency of approximately 1 KHZ—roughly the frequency of serial digital data 16—with a Q of approximately 20. Filter 25, in response to receiving received data 16, generates a transient response 27. Transient response 27 is created due to the components, detailed hereinbelow, which form filter 25.

Coupled with filter 25 and receiving transient response 27 is magnitude comparator 30. Magnitude comparator functionally compares transient response 27 with a preset threshold voltage formed by a voltage dividing resistor network illustrated in FIG. 3. When transient response 27 reaches the threshold voltage for a predetermined period of time, comparator 30 generates detection indicator signal 20, thereby causing the device in a sleep mode, such as the microcontroller 22 of FIG. 1, to awaken into an active mode of operation. In one embodiment of the present invention, a feedback impedance is incorporated within comparator 30 for providing hysteresis to prevent and protect microcontroller 22 from excessively short glitches.

In one embodiment of the present invention, transient response 27 creates a delay representative of the predetermined time period. The predetermined period of time for which the transient response 27, at the very least, remains at the threshold voltage preferably is substantially in the range of 1 millisecond and 5 milliseconds.

Referring to FIG. 3, the preferred embodiment of the present invention is illustrated. Here, filter 25 and magnitude comparator 30 are depicted in greater detail by means of a circuit diagram. Filter 25 receives serial digital data 16 as an input and comprises an input resistor $R_1$ and capacitor $C_1$, preferably equal to approximately 316 KOhms and 0.01 $\mu$F, respectively. Being of an active design, filter 25 comprises an operational amplifier 34 which receives the result of input resistor $R_1$ and capacitor $C_1$ through its negative input terminal. Through its positive input terminal, amplifier 34 receives the voltage resulting from a voltage divider between resistor $R_3$, preferably set at approximately 20 KOhms, and resistor $R_4$, preferably equal to approximately 80.6 KOhms. Resisitor $R_3$ is coupled with a DC power supply 36 through resistor $R_4$. Additionally, a resistor $R_2$ is coupled between resistor $R_1$ and capacitor $C_1$ of the series input RC circuit, while also being coupled to ground. Resistor $R_2$ is preferably equal to approximately 392 Ohms.

Filter 25 also comprises a first feedback loop from the output of amplifier 34 back into the negative terminal through a resistor $R_5$, preferably set at approximately 634 KOhms. Resistor $R_5$ is coupled at the negative input terminal where one end of capacitor $C_1$ of the series input RC circuit is coupled to amplifier 34, as well. Moreover, a second feedback loop is incorporated from the output of amplifier 34 back into the negative terminal through a capacitor $C_2$, preferably equal to approximately 0.01 $\mu$F, where it is coupled to a node comprising resistor $R_1$, capacitor $C_1$, and resistor $R_2$.

The resulting transient response output from filter 25 is according fed into magnitude comparator 30. Magnitude comparator 30 comprises an operational amplifier 38 having a negative and positive input terminal. The negative terminal receives transient response 27 directly from filter 25. The positive terminal, however, receives the voltage corresponding to a node which couples together a resistor $R_6$, preferably equal to approximately 34.8 KOhms, a resistor $R_7$, preferably equal to approximately 20.0 KOhms, and a feedback resistor $R_8$, preferably equal to approximately 1.0 MOhms. A first end of resistor $R_6$ is directly coupled with a DC power supply 40, while the second end is coupled with the positive terminal input node to amplifier 38. A first end of resistor $R_7$ is coupled with the node, while the second end is coupled to ground. The feedback resistor $R_8$ creates a feedback loop from the output signal (detection indicator signal) 20 of amplifier 38 and feeds this output back into the positive terminal input node.

While the particular invention has been described with reference to illustrative embodiments, this description is not meant to be construed in a limiting sense. It is understood that although the present invention has been described in a preferred embodiment, various modifications of the illustrative embodiments, as well as additional embodiments of the invention, will be apparent to persons skilled in the art upon reference to this description without departing from the spirit of the invention, as recited in the claims appended hereto. It is therefore contemplated that the appended claims will cover any such modifications or embodiments as fall within the true scope of the invention.

All of the U.S. Patents and U.S. Patent Applications cited herein are hereby incorporated by reference as if set forth in their entirety.

What is claimed is:

1. A remote control system having a device and an input digital data stream, the device having a sleep mode of operation to conserve energy and an awake mode operation, the input digital data stream having a frequency, said system comprising:

an analog filter for removing noise and for passing the input digital data stream, said passed input digital data stream having a transient response comprising an oscillating signal of increasing peak-to-peak amplitude; and a switch for comparing said transient response of said passed input digital data stream with a threshold voltage, and for switching the device from the sleep mode of operation to the awake mode of operation if said transient response of said passed input digital data stream reaches said threshold voltage.

2. The system of claim 1, wherein passed input digital data stream remains at said threshold voltage for a time period before said switch switches the device from the sleep mode to the awake mode.

3. The system of claim 2, wherein said time period is substantially in the range of 1 millisecond and 5 milliseconds.

4. The system of claim 2, wherein said transient response creates a delay representative of said time period.

5. The system of claim 1, wherein said filter is an active filter.

6. The system of claim 1, wherein said filter is a passband filter having a center frequency substantially equal to the frequency of the input digital data stream.

7. The system of claim 1, wherein said filter comprises:
- a low pass filter for removing low frequency noise and for passing the input digital data stream as an output; and
- an active high pass filter for removing high frequency noise and for passing said output of said low pass filter.

8. The system of claim 1, wherein said switch comprises a comparator for comparing said transient response of said passed input digital data stream with said threshold voltage.

9. The system of claim 8, wherein said switch further comprises a feedback impedance for inhibiting unwanted signals from being processed by the system.

10. A receiver for receiving a remote control signal and for generating a serial digital data stream having an operating frequency, said receiver comprising:
- a processing system having a sleep mode of operation to conserve energy and an awake mode operation;
- a wake up detector for switching said processing system between said sleep mode and said awake mode, said wake up detector comprising:
  - a passband filter for receiving said serial digital data stream, for removing noise, and for passing said serial digital data stream as an output having a transient response comprising an oscillating signal of increasing peak-to-peak amplitude, said passband filter having a center frequency substantially equal to said operating frequency of said serial digital data stream; and
  - a switch for comparing said transient response of said passed serial digital data stream with a threshold voltage, and for switching said processing system from said sleep mode to said awake mode if said transient response of said passed serial digital data stream reaches said threshold voltage.

11. The receiver of claim 10, wherein said switch switches said processing system from said sleep mode to said awake mode after said transient response of said output of said passband filter remains at said threshold voltage for a time period.

12. The receiver of claim 11, wherein said time period is substantially in the range of 1 millisecond and 5 milliseconds.

13. The receiver of claim 11, wherein said transient response creates a delay representative of said time period.

14. The receiver of claim 10, wherein said filter is an active filter.

15. The receiver of claim 10, wherein said switch comprises a comparator for comparing said transient response of said passed input digital data stream with said threshold voltage.

16. The receiver of claim 15, wherein said switch further comprises a feedback impedance for inhibiting unwanted signals from being processed by the system.

17. A remote control system remotely controlled by an analog remote control signal, said remote control system comprising:
- a radio frequency receiver for receiving said analog remote control signal, and for generating a serial digital data stream having an operating frequency;
- a microprocessor having a sleep mode of operation to conserve energy, and an awake mode of operation to process information; and
- a wake up detector for switching said microprocessor between said sleep mode and said awake mode, said wake up detector comprising:
  - an active analog passband filter for receiving said serial digital data stream, for removing noise, and for passing said input digital data stream as an output having a transient response comprising an oscillating signal of increasing peak-to-peak amplitude, said analog passband filter having a center frequency substantially equal to said operating frequency of said serial digital data stream; and
  - a switch for comparing said transient response of said output of said active analog passband filter with a threshold voltage, and for switching said microprocessor from said sleep mode to said awake mode of operation if said transient response of said output of said active analog passband filter reaches said threshold voltage, said switch comprising:
    - a feedback impedance for protecting said microprocessor; and
    - a comparator for comparing said transient response of said output of said active analog passband filter with said threshold voltage.

18. The remote control system of claim 17, wherein said switch switches said processing system from said sleep mode to said awake mode after said transient response of said output of said passband filter remains at said threshold voltage for a time period.

19. The remote control system of claim 18, wherein said time period is substantially in the range of 1 millisecond and 5 milliseconds.

* * * * *